United States Patent [19]
Bandai et al.

[11] Patent Number: 4,593,372
[45] Date of Patent: Jun. 3, 1986

[54] LINE GENERATING METHOD

[75] Inventors: Yoshiaki Bandai; Khoki Hasebe, both of Tokyo, Japan

[73] Assignee: Tokyo Shibaura Denki Kabushiki Kaisha, Kawasaki, Japan

[21] Appl. No.: 554,716

[22] Filed: Nov. 23, 1983

[30] Foreign Application Priority Data

Nov. 29, 1982 [JP] Japan ................................ 57-209025

[51] Int. Cl.[4] .......................... G06F 1/02; G06F 3/153

[52] U.S. Cl. ..................................... 364/719; 340/753; 364/521

[58] Field of Search ........................ 364/719, 520, 521; 340/753, 793

[56] References Cited

U.S. PATENT DOCUMENTS 4,479,192 10/1984 Yamagami .......................... 364/719

OTHER PUBLICATIONS

Newman et al., *Principles of Interactive Computer Graphics,* Second Edition McGraw-Hill 1979, pp. 20-27.
*Nikkei Electronics* 1982, 5, 10, pp. 187-212.

*Primary Examiner*—David H. Malzahn
*Attorney, Agent, or Firm*—Cushman, Darby & Cushman

[57] ABSTRACT

A start point $(x'_0,y'_0)$ and an end point $(x'_m,y'_m)$ of a sub-line are obtained from a start point $(x_0,y_0)$ and an end point $(x_m,y_m)$ of a main line, and coordinate data of the start point $(x'_0,y'_0)$ and the end point $(x'_m,y'_m)$ are supplied to a DDA, so that a point array of the sub-line can be generated from the DDA. The main line is shifted along the x- or y-axis by one dot to obtain the sub-line. Intensity information from an intensity modulation circuit is noninverted/inverted in accordance with the main line/sub-line mode so as to provide a complementary relationship between the main line and the sub-line.

A vector direction from the start point $(x_0,y_0)$ to the end point $(x_m,y_m)$ is detected to belong to one of the four areas obtained by dividing the x-y coordinate plane by lines $y=x$ and $y=-x$ when the start point $(x_0,y_0)$ is defined as the origin of the coordinate system. In accordance with this detection, the start point $(x_0,y_0)$ and the end point $(x_m,y_m)$ are shifted by one (+1 or −1) along the x- or y-axis. These shifted points are used as the start point and the end point for interpolation and are supplied to the DDA. The DDA generates the sub-line obtained by shifting the main line by one dot in the upper direction (positive direction along the y-axis), the lower direction (negative direction along the y-axis), the left direction (negative direction along the x-axis), or the right direction (positive direction along the x-axis).

3 Claims, 10 Drawing Figures

LINE GENERATING METHOD

BACKGROUND OF THE INVENTION

The present invention relates to a line generating method suitable for a graphic display apparatus for displaying a line in accordance with a main line and a sub-line which have complementary luminance intensities.

In a conventional raster scan type graphic display apparatus, a step is formed between displayed dots of an oblique line, and a saw-tooth line becomes noticeable.

In order to overcome this drawback, a conventional method is proposed wherein an oblique line is displayed in accordance with a multi-level density. FIG. 1 shows a line generator to which this method is applied. A digital differential analyzer (hereinafter referred to as a DDA) 11 has a known arrangement wherein coordinates (x,y), given as interpolated points by performing interpolation using a start point $(x_O,y_O)$ and an end point $(x_m,y_m)$, are generated starting from the start point. The DDA 11 adopts the Bresenham's algorithm which is in widespread use. The coordinate data generated by the DDA 11 are used to display a main line. As shown in FIG. 2, when a slope $\Delta y/\Delta x$ of the line (ideal line obtained by connecting the start point and the end point) falls within an angle of 45° ($\Delta y/\Delta x \leqq 1$), the DDA 11 is operated in the following manner in accordance with the Bresenham's algorithm. The coordinate along the y-axis is increased by $\Delta y/\Delta x$ every time the coordinate along the x-axis is increased by one dot. As a result, when the y coordinate exceeds (the preceding y coordinate+1), the y coordinate is regarded as being increased by one dot (i.e., one lattice line segment). The DDA 11 generates an absolute value (to be referred to as an absolute difference) "d" of a difference between the actual value as a result of increment operation and the y coordinate of the interpolated point (x,y) of the main line. On the other hand, when the condition $\Delta y/\Delta x > 1$ (45° or more) is established, the DDA 11 reverses the x- and y-axes, and performs the above operation in accordance with the Bresenham's algorithm. The coordinate along the y-axis is increased by one dot from the start point. Every time the coordinate along the y-axis is increased by one dot, the coordinate along the x-axis is increased by $\Delta x/\Delta y$. When the x coordinate exceeds (the preceding x coordinate+1), the x coordinate is regarded as being increased by one dot (i.e., one lattice line segment). In this case, the absolute difference "d" is an absolute value of a difference between the actual value as a result of an increase and the y coordinate of the interpolated point (x,y) of the main line.

The absolute difference d generated by the DDA 11 is supplied to an intensity modulation circuit 12. The intensity modulation circuit 12 generates intensity information (e.g., two-bit data) 17 indicating an intensity in accordance with the absolute difference "d".

The relationship between the absolute difference "d" and the intensity information 17 is shown in Table 1.

TABLE 1

| d | Intensity information 17 | Intensity level |
|---|---|---|
| $d < 0.25$ | "11" | 4 |
| $0.25 \leqq d < 0.5$ | "10" | 3 |
| $0.5 \leqq d < 0.75$ | "01" | 2 |
| $0.75 \leqq d < 1.0$ | "00" | 1 |

The intensity level in Table 1 indicates the degree of intensity. For example, level 4 indicates an intensity four times that of level 1.

Pieces of intensity information 17 corresponding to the coordinates (x,y) of the interpolated points of the main line which are sequentially generated from the DDA 11 are generated from the intensity modulation circuit 12. The main line is displayed by using these pieces of intensity information 17, as shown in FIG. 2. Referring to FIG. 2, numerals within displayed dots indicate intensity levels, respectively.

Data of the coordinates (x,y) 18 of each main line point is also supplied to a sub-line coordinates generator 13. An upper/right movement designating signal 16 for indicating the upper/right movement in accordance with an absolute value $|\Delta y/\Delta x|$ of the slope of an ideal line A is supplied from a microprocessor 15 to the sub-line coordinates generator 13. When the signal 16 indicates upward movement (e,g. when $|\Delta y/\Delta x| \leqq 1$ is given or an angle is within 45°), the sub-line coordinates generator 13 increases the y coordinate of the main line point (x,y) 18 by +1 and generates data of coordinates (x,y+1) as coordinates (x',y') of a sub-line point 19. Similarly, when the signal 16 indicates rightward movement (e.g., when the abosolute value $|\Delta y/\Delta x| > 1$ is given or the angle exceeds 45°), the sub-line coordinates generator 13 increases the x coordinate of the main line point (x,y) 18 by +1 and generates data of coordinates (x+1,y) as the coordinates (x',y') of a sub-line point 19. The two-bit intensity information 17 for the main line which is generated from the intensity modulation circuit 12 is supplied to an inverter 14 so as to invert the level of the sub-line information. As a result, the inverter 14 generates intensity information 17' for the sub-line. The data 19 of coordinates (x',y') which are sequentially generated from the sub-line coordinates generator 13 and the sub-line intensity information generated by the inverter 14 are used to display the sub-line shown in FIG. 2. In this case, the intensities of the main line and the sub-line are complementary. A sum of the intensity of any given main line dot and that of a corresponding sub-line dot is constant. In this manner, when a single line is displayed by using both the main line and the sub-line, a smooth oblique line can be observed by an operator.

Assume that a polygonal line consisting of a line with a slope of less than 45° and a line with a slope of more than 45° is generated by the line generator shown in FIG. 1, as is apparent from the above description, a main line and a sub-line are obtained, as shown in FIG. 3. In this case, the main line and the sub-line are not observed separately by the operator on the display screen. As shown in FIG. 4, the main line and the sub-line are observed as a single polygonal line.

However, according to the conventional line generating method, a distortion occurs at a bent portion between a line with a slope of less than 45° and a line with a slope of more than 45°. In particular, when a circle or arc is drawn by a polygon or polygonal line, misalignment as shown in FIG. 5 occurs, resulting in inconvenience.

SUMMARY OF THE INVENTION

It is an object of the present invention to provide a line generating method for displaying a smooth polygonal line consisting of a line with a slope of less than 45° and a line with a slope of more than 45°.

In order to achieve the above object of the present invention, there is provided a line generator, comprising:

(a) a digital differential analyzer (DDA) generating coordinate data of an interpolated point in accordance with given start and end points and absolute difference data between an actual value and the coordinate data of an interpolated point;

(b) an intensity modulation circuit for generating digital intensity information corresponding to the absolute difference data;

(c) an inversion control circuit for noninverting/inverting a level of an output from said intensity modulation circuit in accordance with a main line/sub-line designating signal; and (d) a microprocessor for supplying coordinate data of the start point $(x_O,y_O)$ and the end point $(x_m,y_m)$ to said digital differential analyzer, for supplying to said inversion control circuit said main line/sub-line designating signal indicating a main line, for determining that a vector direction from the start point $(x_O,y_O)$ to the end point $(x_m,y_m)$ belongs to one of four areas divided by lines $y=x$ and $y=-x$ when the start point $(x_O,y_O)$ is defined as an origin of an x-y coordinate system, and for supplying to said digital differential analyzer coordinate data of a start point $(x_O',y_O')$ and an end point $(x_m',y_m')$ which are obtained by incrementing or decrementing x or y coordinates of the start point $(x_O,y_O)$ and the end point $(x_m,y_m)$, respectively, by one in accordance with the vector determination.

BRIEF DESCRIPTION OF THE DRAWINGS

Other objects and features of the present invention will be apparent from the following descriptions of the accompanying drawings summarized below.

DETAILED DESCRIPTION OF THE PREFERRED EMBODIMENT

Figure 1:
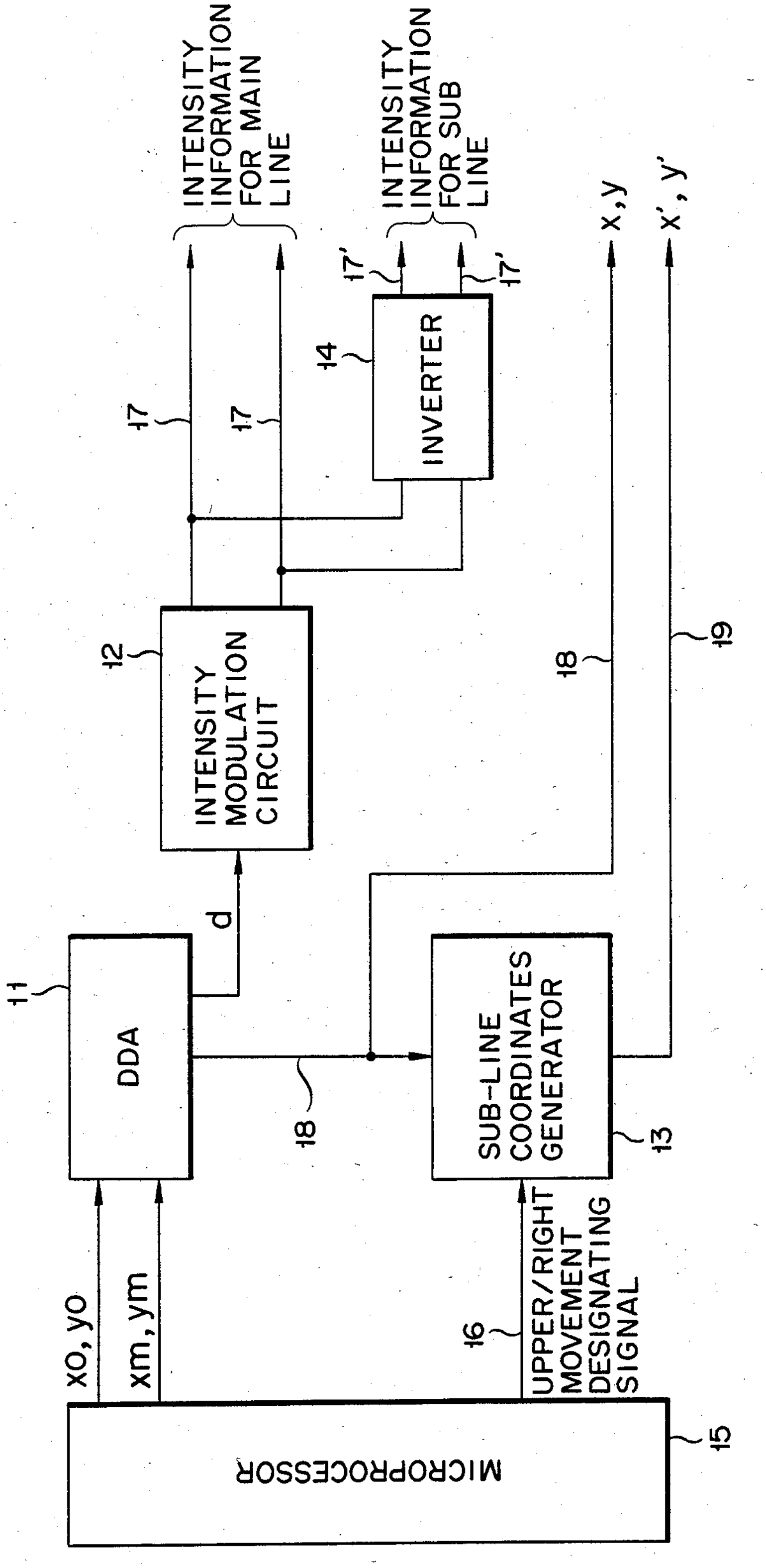
FIG. 1 PRIOR ART
FIG. 1 is a block diagram of a conventional line generator.
Figure 2:
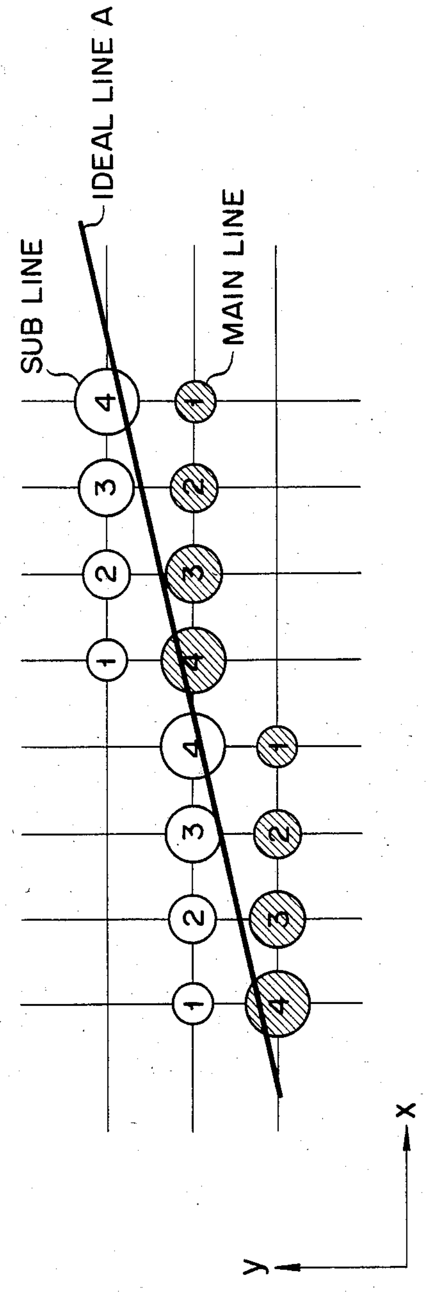
FIG. 2 is a representation for explaining the relationship between a main line and a sub-line with respect to an ideal line.
Figure 3:
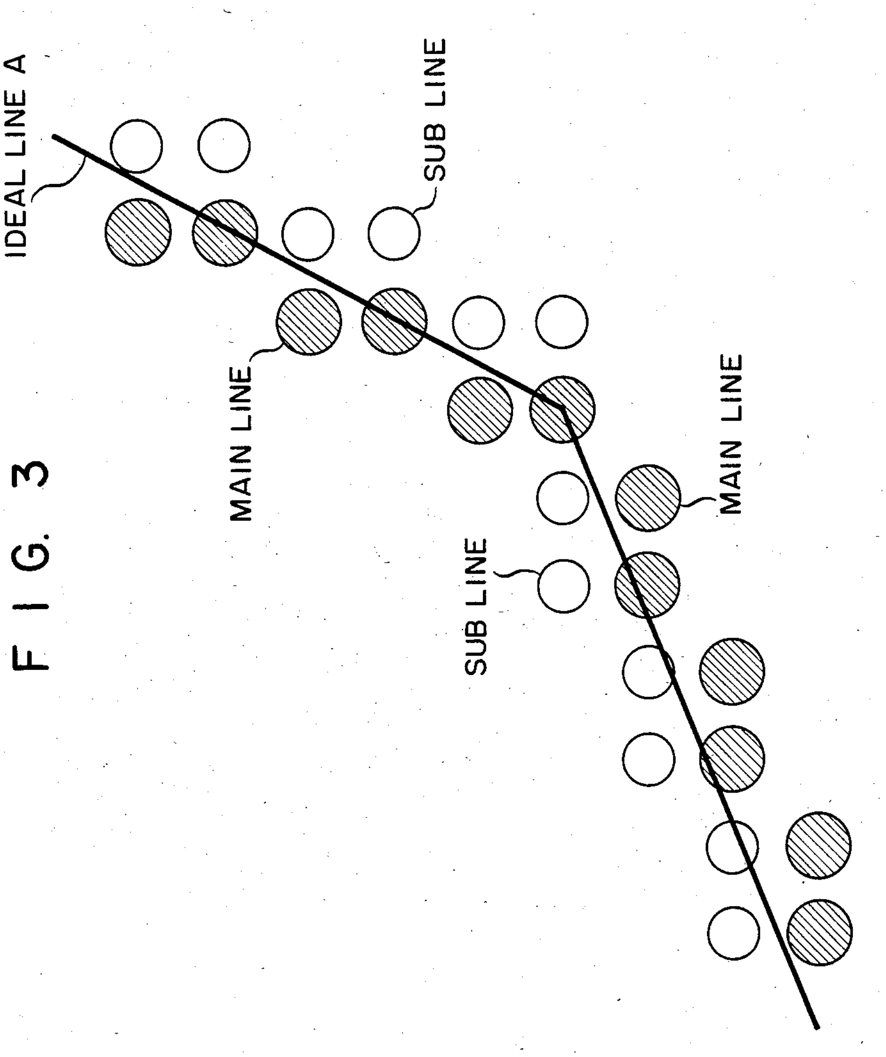
FIG. 3 is a representation for explaining the relationship between the main line and the sub-line when a polygonal line consisting of a line with a slope of more than 45° and a line with a slope of less than 45° is displayed.
Figure 4:
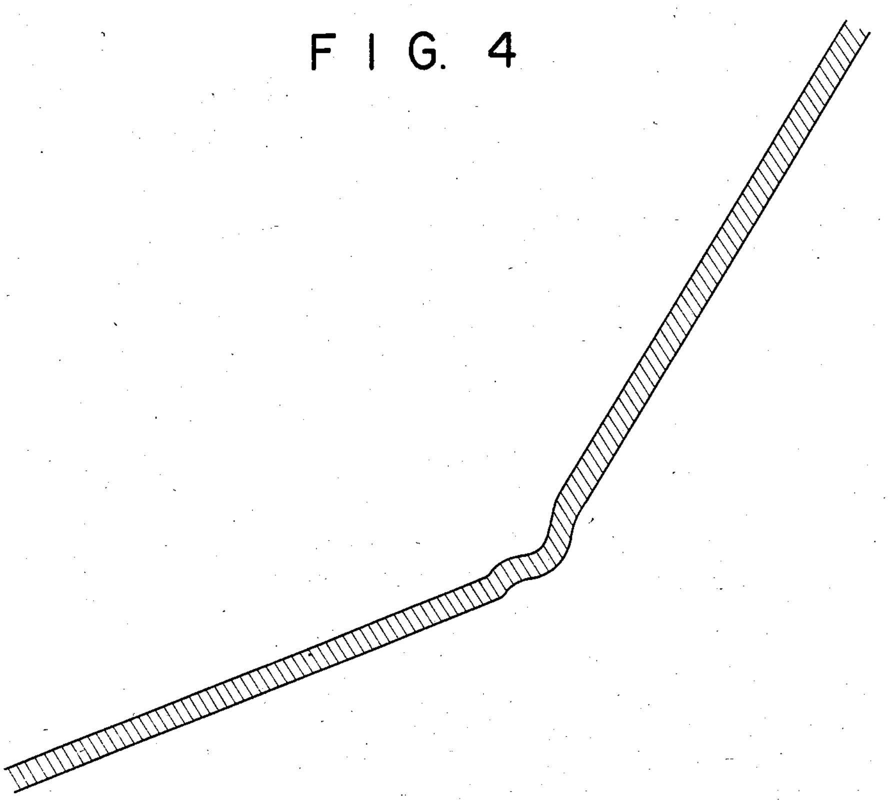
FIG. 4 is a representation showing the relationship between the main line and the sub-line when the polygonal line shown in FIG. 3 is actually observed by an operator.
Figure 5:
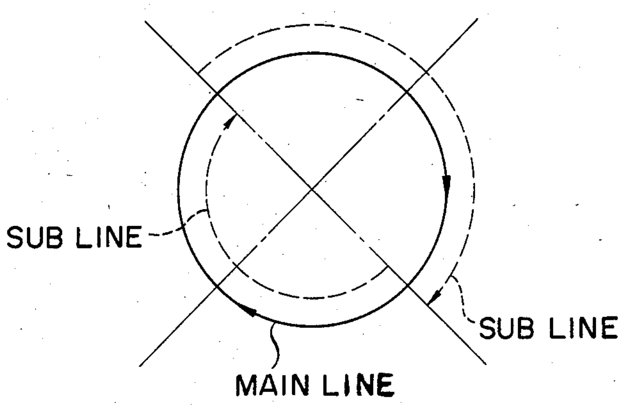
FIG. 5 is a representation for explaining the relationship between the main line and the sub-line when a circle is drawn by the line generator shown in FIG. 1.
Figure 6:
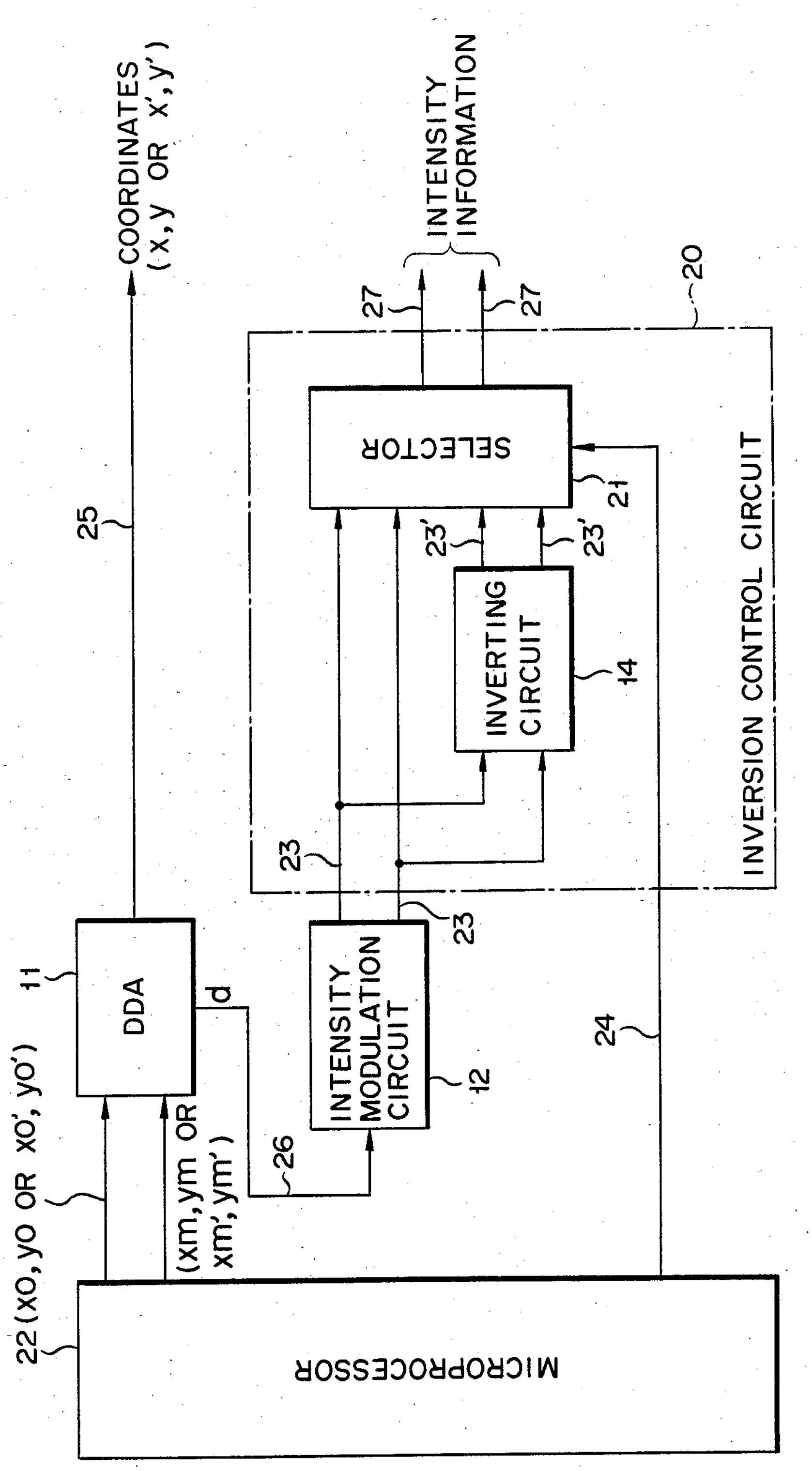
FIG. 6 is a block diagram of a line generator according to an embodiment of the present invention.

FIG. 6 is a block diagram of a line generator according to an embodiment of the present invention. The same reference numerals as used in FIG. 1 denote the same parts in FIG. 6, and a detailed description thereof will be omitted. An inversion control circuit 20 comprises: an inverting circuit 14 (inverter 14 in FIG. 1) of two inverters (not shown) for inverting a level of 2-bit intensity information 23 generated from an intesity modulation circuit 12; and a selector 21. The selector 21 selects one of the outputs from the intensity modulation circuit 12 and the inverting circuit 14 in accordance with the logic status of a main line/sub-line designating signal 24 to be described later.

A microprocessor 22 supplies coordinate data of a start point $(x_O,y_O)$ and an end point $(x_m,y_m)$ to a DDA 11 so as to start the DDA 11. The DDA 11 then generates a point array of the main line. The microprocessor 22 also calculates a start point $(x_O',y_O')$ and an end point $(x_m',y_m')$ of the sub-line in accordance with the start point $(x_O,y_O)$ and the end point $(x_m,y_m)$. Coordinate data of the start point $(x_O',y_O')$ and the end point $(x_m',y_m')$ are supplied to the DDA 11 so as to start the DDA 11. The DDA 11 then generates a point array of the sub-line. The microprocessor 22 generates a main line/sub-line designating signal 24 of logic "1", for example, to cause the DDA 11 to generate the point array of the main line. In this case, the microprocessor 22 generates a main line/sub-line designating signal 24 of logic "0" to cause the DDA 11 to generate the point array of the sub-line.

Figure 7A:
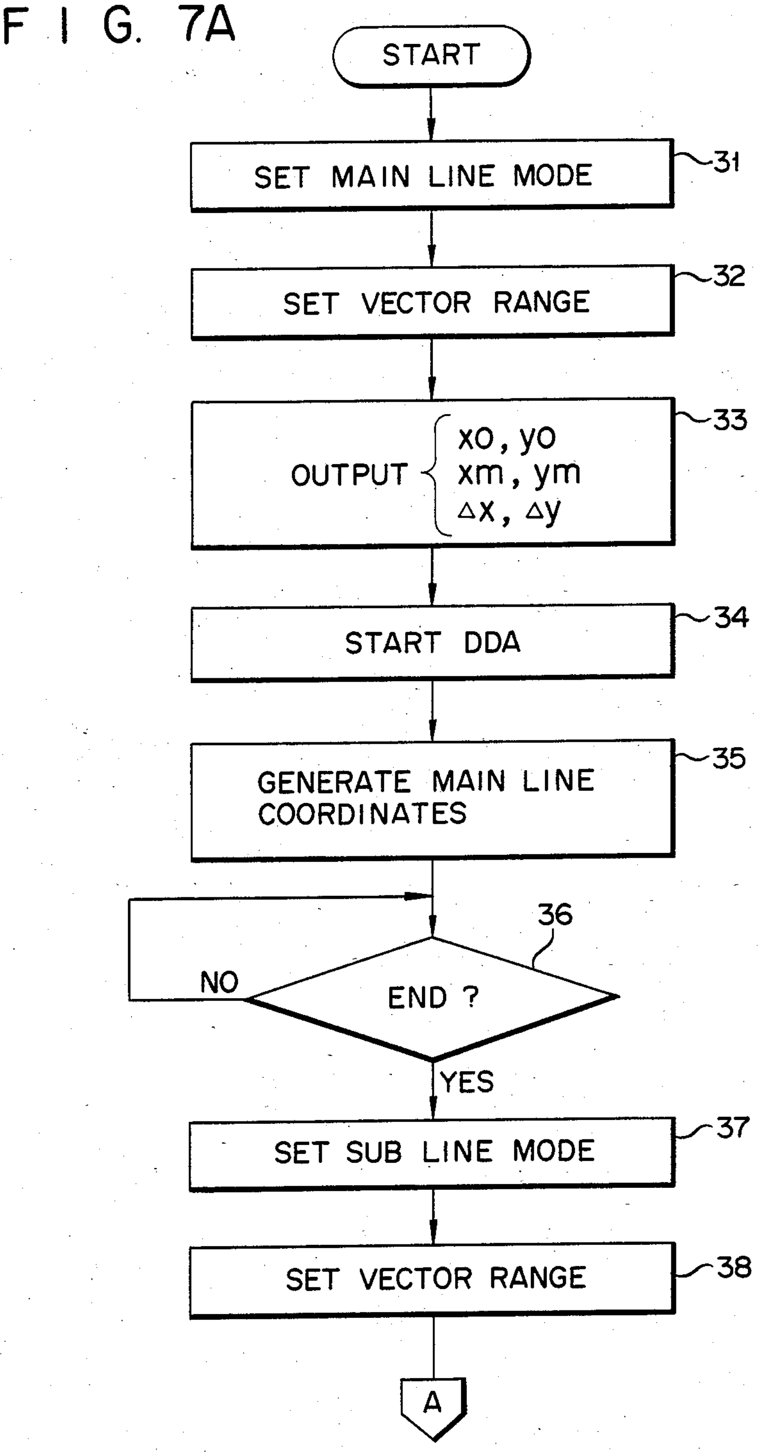
FIGS. 7A and 7B, respectively, are flow charts for explaining the operation of the line generator shown in FIG. 6.
Figure 7B:
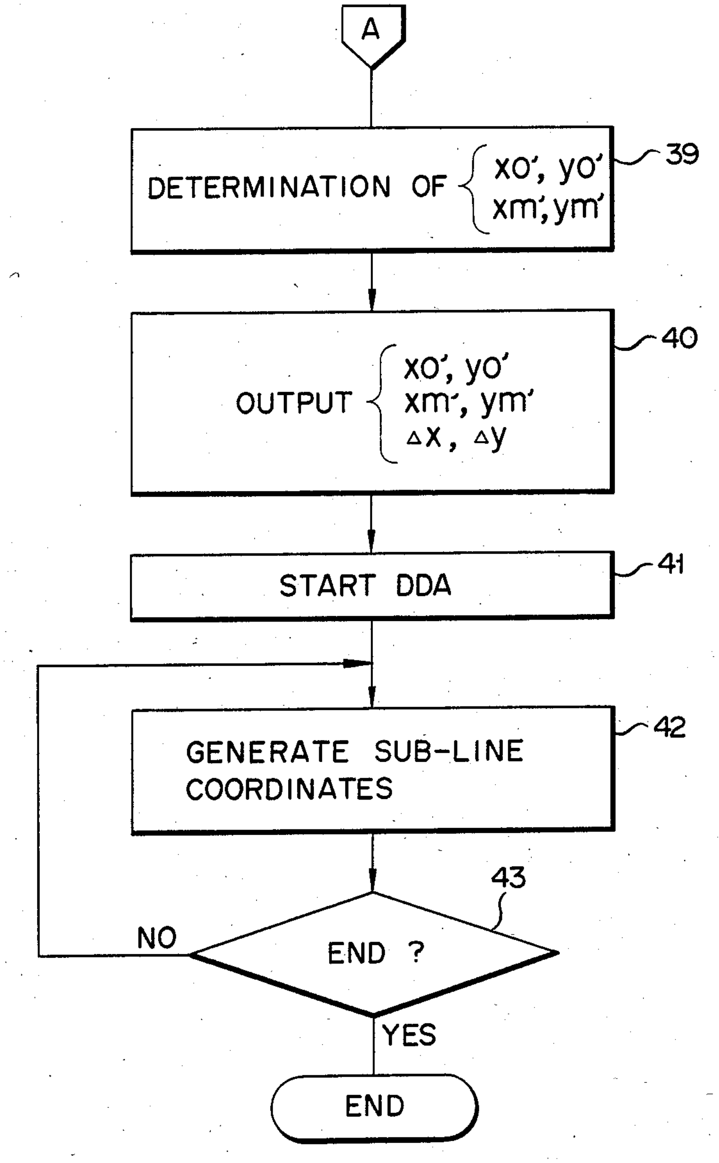

The operation of the line generator according to this embodiment will now be described with reference to the flow charts in FIGS. 7A and 7B.

The microprocessor 22 sets the main line mode to generate a main line (step 31). In this case, the microprocessor 22 supplies a main line/sub-line designating signal 24 of logic "1" to the selector 21 of the inversion control circuit 20. The microprocessor 22 determines that the vector direction from the start point $(x_O,y_O)$ to the end point $(x_m,y_m)$ corresponds to one of eight ranges and supplies a detection signal to the DDA 11. The signal is then set in the DDA 11 (step 32).

Figure 8:
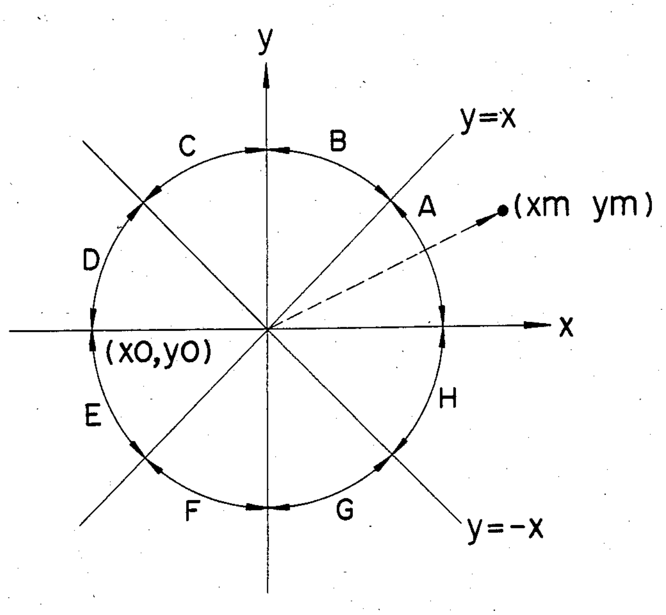
FIG. 8 is a representation showing eight areas for determining vector directions of the line generator shown in FIG. 6.
Figure 9:
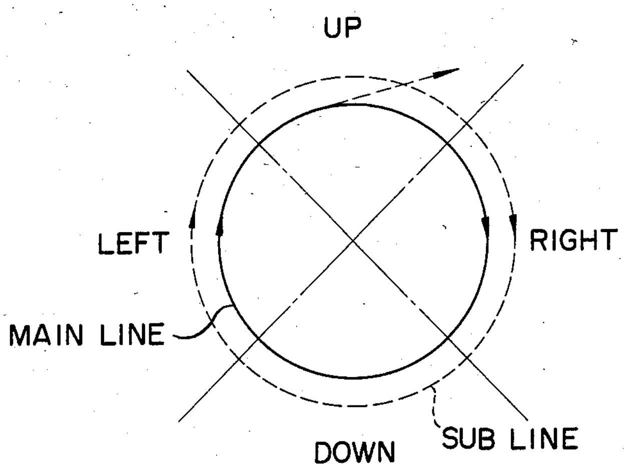
FIG. 9 is a representation for explaining the relationship between the main line and the sub-line when a circle is displayed by the line generator shown in FIG. 6.

The eight ranges correspond to octants obtained by dividing the x-y coordinate plane by the x-axis, a line $y=x$, the y-axis and a line $y=-x$, and are designated as areas A to H when the start point $(x_O,y_O)$ is defined as the origin of the x-y coordinate system, as shown in FIG. 8. The area A which is located in the first quadrant is defined by the x-axis and the line $y=x$; B (which is located in the first quadrant), by the line $y=x$ and the y-axis; C (which is located in the second quadrant), by the y-axis and the line $y=-x$; D (which is located in the second quadrant), by the line $y=-x$ and the x-axis; E (which is located in the third quadrant), by the x-axis and the line $y=x$; F (which is located in the third quadrant), by the line $y=x$ and the y-axis; G (which is located in the fourth quadrant), by the y-axis and the line $y=-x$; and H (which is located in the fourth quadrant), by the line $y=-x$ and the x-axis.

When the microprocessor 22 determines the correspondence between the vector direction and one of the areas A to H, coordinate data of the start point $(x_O,y_O)$ and the end point $(x_m,y_m)$ and then of the start point $(x_O',y_O')$ and the end point $(x_m',y_m')$ are supplied from the microprocessor 22 to the DDA 11 (step 33). Thereafter, the microprocessor 22 starts the DDA 11 (step 34). The DDA 11 sequentially generates data of coordinates (x,y) 25 of the main line points by using information supplied from the microprocessor 22 in accordance with the Bresenham's algorithm (step 35). In this case, the DDA 11 generates absolute difference "d" 26 corresponding to the coordinate data. Since the Bresenham's algorithm is not directly concerned with the present invention, a description thereof will be omitted.

The absolute difference "d" 26 generated by the DDA 11 is supplied to the intensity modulation circuit 12. The intensity modulation circuit 12 supplies 2-bit intensity information 23 (Table 1) to the inversion control circuit 20 in accordance with the absolute difference "d" 26. The information supplied to the inversion control circuit 20 is inverted and is supplied to the selector 21. As previously described, the main line/sub-line designation signal 24 is set at logic "1", so that the selector 21 selects the information 23 from the intensity modulation circuit 12. In the main line mode, the inversion control circuit 20 generates as the intensity information 27 the information 23 from the intensity modulation circuit 12. The coordinates (x,y) of the main line point and the intensity information 27 are repeatedly generated by the DDA 11 and the inversion control circuit 20, respectively, until an end of generation of the point array is detected (step 36). In response to this detection, the main line is displayed under the control of a display control section (not shown).

When the microprocessor 22 detects the end of generation of the main line point array, it changes the mode. The microprocessor 22 sets the sub-line mode (i.e., the main line/sub-line designating signal 24 goes from logic "1" to logic "0") (step 37).

The microprocessor 22 determines that the vector direction of the sub-line corresponds to one of areas A to H of the x-y coordinate plane (step 38). The sub-line corresponds to a line obtained by shifting the main line by one dot. The vector direction of the sub-line is the same as that of the main line. In step 38, the same content as in step 32 is set in the DDA 11. The microprocessor 22 determines the start point $(x_{o}',y_{o}')$ and the end point $(x_m', y_m')$ of the sub-line (step 39) in the following manner. The microprocessor 22 determines that the vector direction of the line from the start point $(x_{o}',y_{o}')$ to the end point $(x_m',y_m')$ corresponds to one of the eight areas. When the start point $(x_{o}',y_{o}')$ is defined as the origin of the x-y coordinate system, the microprocessor 22 determines that the vector direction corresponds to the areas A and H, B and C, D and E or F and G, each pair of which is divided by one of the lines $y=x$ and $y=-x$ (FIG. 8). In accordance with this determination, one of the x and y coordinates of each of the start point $(x_o,y_o)$ and the end point $(x_m,y_m)$ is increased by one or decreased by one, as shown in Table 2, thereby obtaining the start point $(x_{o}',y_{o}')$ and the end point $(x_m',y_m')$.

TABLE 2

| Main line | | | Sub-line | |
|---|---|---|---|---|
| Start point | End point | Area | Start point | End point |
| $(x_o,y_o)$ | $(x_m,y_m)$ | A, H | $(x_o,y_o+1)$ | $(x_m,y_m+1)$ |
| | | D, E | $(x_o,y_o-1)$ | $(x_m,y_m-1)$ |
| | | B, C | $(x_o-1,y_o)$ | $(x_m-1,y_m)$ |
| | | F, G | $(x_o+1,y_o)$ | $(x_m+1,y_m)$ |

After the microprocessor 22 has determined the start point $(x_{o}',y_{o}')$ and the end point $(x_m',y_m')$ of the sub-line, it supplies coordinate data of the start point $(x_{o}',y_{o}')$ and the end point $(x_m',y_m')$ and data of $\Delta x(=x_{o}'-x_m')$ and $\Delta y(=y_{o}'-y_m')$ to the DDA 11 (step 40). The microprocessor 22 then starts the DDA 11 (step 41). The DDA 11 sequentially generates data 25 of coordinates (x',y') of the sub-line by using the information from the microprocessor 22 in accordance with the Bresenham's algorithm (step 42). The DDA 11 generates the absolute difference "d" 26 corresponding to the coordinate data. The absolute difference d 26 are supplied to the intensity modulation circuit 12. The intensity modulation circuit 12 supplies to the inversion control circuit 20 intensity information 23 corresponding to each absolute difference "d" 26. As a result, the intensity information is level-inverted by the inverting circuit 14 in the inversion control circuit 20. In this case, since the main line/sub-line designating signal 24 is set at logic "0", the selector 21 selects the information 23' from the inverting circuit 14. In the sub-line mode, the inversion control circuit 20 generates as the intensity information 27 of the coordinates (displayed dot corresponding to the dot of the main line) of the sub-line the information 23' which is obtained by inverting the level of the information 23 from the intensity modulation circuit 12. The data of coordinates (x',y') 25 of the sub-line and the intensity information 27 are repeatedly generated by the DDA 11 and the inversion control circuit 20, respectively, until an end of generation of the point array of the sub-line is detected (step 43). The sub-line is then displayed in accordance with these pieces of data under the control of a display control section (not shown).

As will have been apparent from Table 2, the start point $(x_{o}',y_{o}')$ and end point $(x_m',y_m')$ of the sub-line are obtained by incrementing by one or decrementing by one the x or y coordinates of the start point $(x_o,y_o)$ and the end point $(x_m,y_m)$ of the main line. Therefore, any coordinates (x',y') of a sub-line point which are generated from the DDA 11 must be the coordinates obtained by incrementing by one or decrementing by one the x or y coordinates of a corresponding point of the main line. In other words, the sub-line can be obtained by shifting the main line by one along the x- or y-axis. For example, when the vector direction from the start point to the end point of the main line belongs to the area A or H, the sub-line can be obtained by increasing the y coordinates of the main line points by one each (i.e., by shifting the main line upward by one dot). Similarly, when the vector direction corresponds to the area D or E, the sub-line can be obtained by decreasing the y coordinates of the main line points by one each (i.e., by shifting the main line downward by one dot). Furthermore, when the vector direction corresponds to the area B or C, the sub-line can be obtained by decreasing the x coordinates of the main line points by one each (i.e., by shifting the main line to the left by one dot). Similarly, when the vector direction corresponds to the area F or G, the sub-line can be obtained by increasing the x coordinates of the main line points by one each (i.e., by shifting the main line to the right by one dot).

According to the embodiment described above, the sub-line can be generated by shifting the main line upward, downward, or to the right or left by one dot in accordance with the vector direction from the start point to the end point. Therefore, in the line (having a slope of more than 45° or belonging to the area B) near a bent portion of a polygonal line consisting of the line with the slope of more than 45° and a line with a slope of less than 45°, the sub-line is generated to the left of the main line, thereby eliminating a distortion. The complementary relationship between the intensities of the main line and the sub-line is apparent from the operation of the inversion control circuit 20 in the main line and sub-line mode. According to the present invention, when a circle is approximated in accordance with a polygon, the inside area of the circle is divided into four areas respectively corresponding to the areas A and H, B and C, D and E, and F and G in accordance with the vector direction. Therefore, the position of the sub-line can be selected at the upper, lower, right or left side, thereby drawing a smooth circle.

What is claimed is:

1. A line generator comprising:

(a) a digital differential analyzer (DDA) generating coordinate data of an interpolated point in accordance with given start and end points and absolute difference data between an actual value and the coordinate data of an interpolated point;

(b) an intensity modulation circuit for generating digital intensity information corresponding to the absolute difference data;

(c) an inversion control circuit for noninverting/inverting a level of an output from said intensity modulation circuit in accordance with a main line/sub-line designating signal; and (d) a microprocessor for supplying coordinate data of the start point $(x_O,y_O)$ and the end point $(x_m,y_m)$ to said digital differential analyzer, to supply to said inversion control circuit a main line/sub-line designating signal indicating said main line, for determining that a vector direction from the start point $(x_O,y_O)$ to the end point $(x_m,y_m)$ belongs to one of four areas divided by lines $y=x$ and $y=-x$ when the start point $(x_O,y_O)$ is defined as an origin of an x-y coordinate system, and for supplying to said digital differential analyzer coordinate data of a start point $(x_O',y_O')$ and an end point $(x_m',y_m')$ which are obtained by moving x or y coordinates of the start point $(x_O,y_O)$ and the end point $(x_m,y_m)$, respectively, by one in accordance with the vector determination.

2. A generator according to claim 1, wherein the sub-line can be obtained by increasing the y coordinates of the main line points by one each when the vector direction from the start point to the end point of the main line belongs to area A or H, the sub-line can be obtained by decreasing the y coordinates of the main line points by one each when the vector direction corresponds to the area D or E, the sub-line can be obtained by decreasing the x coordinates of the main line points by one each when the vector direction corresponds to the area B or C and the sub-line can be obtained by increasing the x coordinates of the main line points by one each when the vector direction corresponds the area F or G, wherein the areas A and H are defined as divided by the axis x and one of the lines $y=x$ and $y=-x$, the areas B and C are defined as divided by the axis y and one of the lines $y=x$ and $y=-x$, the areas D and E are defined as divided by the axis x and the one of the lines $y=x$ and $y=-x$, and the areas F and G are defined as divided as the axis y and one of the lines $y=x$ and $y=-x$.

3. A method for generating a line from a line generator having a digital differential analyzer generating coordinate data of an interpolated point in accordance with given start and end points, an intensity modulation circuit for generating digital intensity information indicating an intensity level corresponding to a difference between an actual value and the coordinates of the interpolated point, and an inversion control circuit for noninverting/inverting a level of an output from said intensity modulation circuit in accordance with a main line/sub-line designating signal, comprising the steps of:

(a) supplying coordinate data of the start point $(x_O,y_O)$ and the end point $(x_m,y_m)$ to said digital differential analyzer;

(b) supplying to said inversion control circuit a main line/sub-line designating signal indicating a main line;

(c) causing said inversion control circuit to generate digital intensity information corresponding to a point array of the main line;

(d) determining that a vector direction from the start point $(x_O,y_O)$ to the end point $(x_m,y_m)$ belongs to one of four areas divided by lines $y=x$ and $y=-x$ when the start point $(x_O,y_O)$ is defined as an origin of an x-y coordinate system;

(e) supplying to said digital differential analyzer coordinate data of a start point $(x_O',y_O')$ and an end point $(x_m',y_m')$ which are obtained by incrementing or decrementing x or y coordinates of the start point $(x_O,y_O)$ and the end point $(x_m,y_m)$, respectively, by one in accordance with the vector determination, (f) supplying a main line/sub-line designating signal indicating a sub-line to said digital differential analyzer;

(g) generating digital intensity information indicating a point array of the sub-line; and (h) generating the sub-line which is shifted by one to be parallel to the main line in one of upper, lower, right and left directions.

* * * * *